Patented Oct. 19, 1948

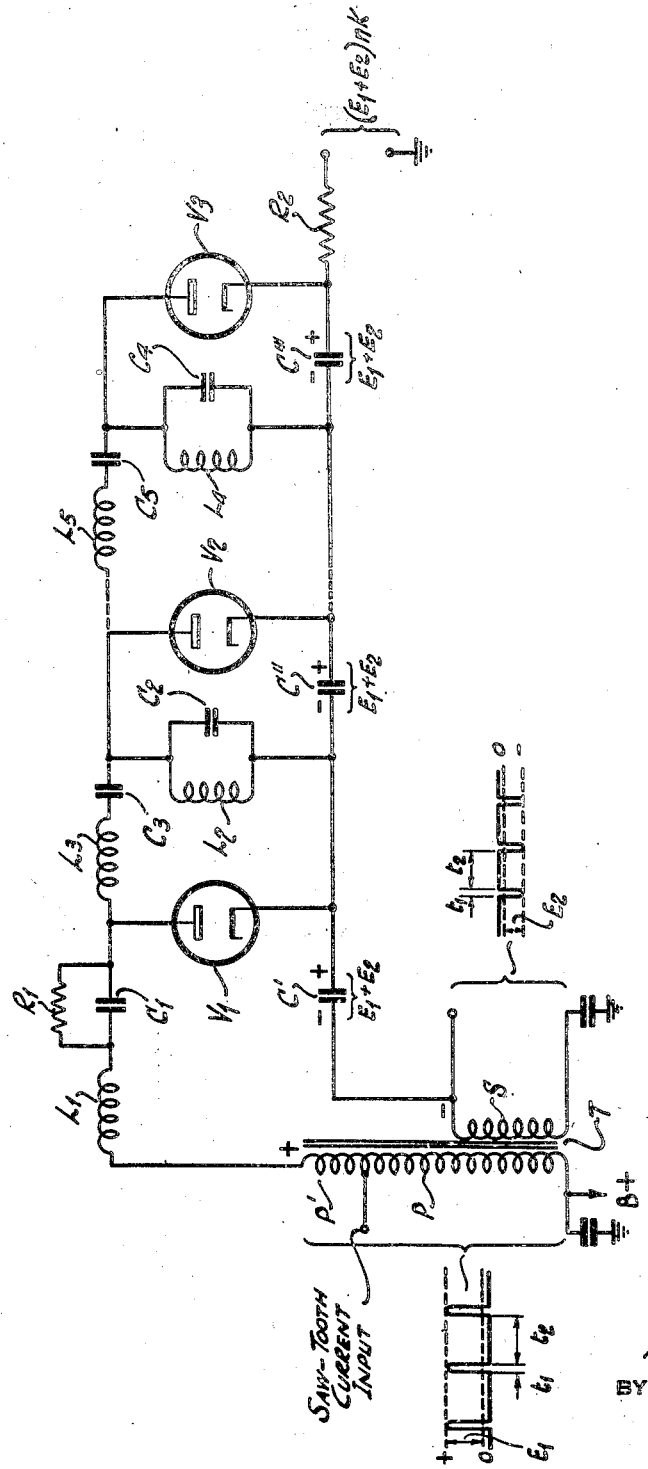

2,452,013

UNITED STATES PATENT OFFICE 2,452,013

POWER SUPPLY

Albert Wiley Friend, Collingswood, N. J., assignor to Radio Corporation of America, a corporation of Delaware Application November 29, 1945, Serial No. 631,732

7 Claims. (Cl. 171—97)

The present invention relates to high-voltage rectifier circuits, and more particularly relates to a rectifier of the cascade type which operates either from a unidirectional pulse input or from a source of radio-frequency energy.

In a copending application of Otto H. Schade, Serial No. 578,678, filed February 19, 1945, and issued as Patent No. 2,439,223 on April 6, 1948, there is disclosed a multi-unit voltage step-up system which is designed to produce, from a unidirectional pulse input, a D.-C. output voltage which is substantially the sum of the voltages rectified by the individual units. Each of these individual units includes, in one of the modifications set forth in the Schade application, a two-element electron discharge tube in series with a condenser. The series combination of tube and condenser is connected across a resistance element which is in parallel relation with the source of input power. Consequently, when a number of these units are ararnged in cascade, the voltage rectified by the electron discharge tube of each unit and stored in its series condenser will approximately equal the peak value of the input pulses. By selectively coupling together a plurality of these units, a substantially smooth D.-C. output voltage may be obtained which is approximately the sum of the charges on the condensers of each of the individual units.

In a system such as that described above, the lumped and distributed capacitances C of the rectifying units are, in effect, combined together across the source of input power. If this source comprises a transformer having inductance L, as is the case in television systems where the input pulses to the rectifier circuit are derived from the voltage surges produced across the windings of the horizontal, or line, deflection transformer during the retrace periods of the cathode ray beam, then the effect of this summation of rectifier unit capacitances is to limit the $$\sqrt{\frac{L}{C}}$$

ratio of the system.
Since this $$\sqrt{\frac{L}{C}}$$

ratio or, in other words, the characteristic impedance Z of the network, determines in part the time required for the retrace, or snapback, of the cathode ray beam, it will be apparent that one result of this summation of network capacitances is to restrict, for a given value of L, the percentage of each deflection cycle that may be allotted to scansion of the image raster by the cathode ray beam. Alternately, with the same value of characteristic impedance Z, the lumped and distributed network capacitances of a system such as above described prevent the voltage step-up, which is obtainable from the coupling or deflection transformer, from exceeding an amount determined by the ratio between such capacitances and the inductance of the step-up winding.

One object of the present invention, therefore, is to provide a high-voltage rectifier system comprising a plurality of individual rectifying units connected in cascade, the system being so arranged that the lumped and distributed capacitances of the individual units are not directly added together across the input of the system.

A further object of the invention is to provide means for raising the $$\sqrt{\frac{L}{C}}$$

ratio in a high-voltage cascaded rectifier system in which the input thereto includes an inductive member.

A still further object of the invention is to provide a multiple-unit high-voltage rectifier system of the cascade type which includes a resonant energy-storage reservoir associated with each rectifying unit, these energy-storage reservoirs serving to provide repeated cyclic charging of the D.-C. energy-storage capacitors of their respective units during operation of the system.

An additional object of the invention is to provide a high-voltage rectifier system of the cascade type having low power loss and improved regulation.

Other objects and advantages will be apparent from the following description of a preferred form of the invention and from the drawing, the single figure of which is a circuit diagram of a rectifier system in accordance with the invention.

Referring now to the drawing, there is shown a multiple-unit high-voltage rectifier of the cascade type. The rectifier is designed to be energized from a transformer T having a primary winding P, a primary step-up winding P′, and a secondary winding S, the lower end (in the drawing) of each of windings P and S being maintained at A.-C. ground potential as shown. Winding S is reversed with respect to winding P, so that when the upper end of winding P is of positive polarity, the upper end of winding S is of negative polarity, as indicated.

The transformer T may constitute the horizontal, or line, cathode ray beam deflection transformer in a television system. In such an event, and assuming that the deflection of the cathode ray beam is accomplished by electromagnetic means, a step-down ratio normally exists between the primary winding P and the secondary winding S, the latter winding being connected so that the current induced therein during operation of the system flows through the cathode ray beam line deflection coils to thereby effect the desired line-scanning action of the beam. The primary winding P is connected to receive current of substantially sawtooth waveform from a suitable source such as a power output tube (not shown).

It is desirable that, in a system of this nature, the current flow in the windings P and S change at a relatively constant rate during the scanning portion of each operating cycle so as to preclude distortion of the reproduced image which normally results from non-linear scanning of the image raster by the cathode ray beam.

It is known that while the current flow through an inductive member is changing at a relatively constant rate, the voltage appearing across the inductive member is substantially constant. Upon a rapid reversal of the current flow through the inductive member (in this case the primary winding P) during the retrace portion of the deflecting cycle, however, the voltage appearing across the inductive member sharply increases to reach a considerable amplitude. Accordingly, the waveform of the voltage appearing across the stepped-up primary winding PP' of transformer T is that of a series of positive pulses of duration $t_1$ and amplitude $E_1$, spaced apart by the time interval $t_2$. Each period $t_1+t_2$, in the example given, thus constitutes one complete cycle of deflection of the cathode ray beam, the interval $t_2$ corresponding to the line-scanning portion of the cycle, and the interval $t_1$ corresponding to the retrace portion thereof.

Since the secondary winding S of transformer T is wound with fewer turns than the primary winding P, and since the two windings are reversed with respect to each other, the waveform of the voltage across the secondary winding S will be substantially as illustrated, the pulses being of negative polarity and of an amplitude $E_2$ smaller than the amplitude $E_1$ of the pulses appearing across the stepped-up primary winding PP'.

The rectifier system of the present invention includes a number of individual units arranged in cascade. The first of these units includes an electron-discharge tube $V_1$ having an anode and a cathode. Although tube $V_1$ has been illustrated as a tube of the diode type, it will be clear that other forms of unilateral conducting devices may be substituted therefor, if desired. The cathode of diode $V_1$ is connected to one plate of a condenser or other energy-storage device C'. The other plate of condenser C' is joined to the end of the secondary winding S of transformer T on which the negative pulses of amplitude $E_2$ appear during the time interval $t_1$. The anode of diode $V_1$ is connected through a series combination of condenser $C_1$ and inductance $L_1$ to the end of the primary step-up winding P' of transformer T on which the positive pulses of amplitude $E_1$ appear during the time interval $t_1$. A resistor $R_1$ shunts capacitor $C_1$.

It will be clear from the above description that during the time interval $t_1$ positive pulses will be applied to the anode of tube $V_1$ and negative pulses to the cathode thereof. Tube $V_1$ will thus be rendered conductive to charge condenser C' to a value $E_1+E_2$ representing the peak-to-peak value of the positive and negative pulses appearing across the stepped-up primary and the secondary windings respectively of the transformer T.

The series combination of inductance $L_1$ and condenser $C_1$ is selected to have a resonant frequency such that the period of one-half cycle thereof is substantially equal to the retrace time $t_1$. As a result, the impedance of $L_1C_1$ is negligible at the operating frequency of the rectifier system. The resistor $R_1$ provides a D.-C. path around condenser $C_1$.

The second of the rectifier units illustrated in the drawing includes a second electron discharge tube $V_2$ having an anode and a cathode. Also shown is a second condenser or other energy-storage device C'', the cathode of tube $V_2$ being connected to one plate of condenser C''. The other plate of condenser C'' is joined to the cathode of tube $V_1$, and also to one terminal of a network formed from the parallelly connected inductance-capacitance elements $L_2C_2$, the remaining terminal of the inductance-capacitance circuit $L_2C_2$ being connected to the anode of tube $V_2$ and also to the anode of tube $V_1$ through a second series combination of inductance $L_3$ and condenser $C_3$. The parallel circuit $L_2C_2$ is designed to offer a high-impedance path at the major free resonance frequency of the transformer T and its associated elements. Therefore, since the voltages at the opposite terminals of this parallel circuit $L_2C_2$ are the positive voltage $E_1$ and the negative voltage $E_2$ respectively during interval $t_1$, it follows that tube $V_2$ will be rendered conductive during this interval $t_1$ to charge capacitor C'' to a voltage $E_1+E_2$ similar to the voltage $E_1+E_2$ developed on capacitor C' by the conduction of tube $V_1$.

The series inductance-capacitance circuit $L_3C_3$ has a function similar to that of the corresponding circuit $L_1C_1$ of the first rectifier unit, in that it offers a low-impedance A.-C. path at the recurrence frequency of the input pulses. In this connection, it should be noted that the charge developed on each of condensers $C_1$ and $C_3$ is approximately equal to $E_1+E_2$.

Also illustrated in the drawing is a third rectifier unit including an electron discharge tube $V_3$, an energy-storage device or condenser C''', and a parallel inductance-capacitance combination $L_4C_4$. These elements are interrelated in the same manner as the corresponding elements $V_2$, C'', and $L_2C_2$ of the second rectifier unit. Coupling between the units is provided by the series resonant circuit $L_5C_5$ which is similar in design and function to the series resonant circuit $L_3C_3$ which couples together the first and second rectifying units. In operation, tube $V_3$ is rendered conductive during interval $t_1$ to charge condenser C''' to a peak value $E_1+E_2$, this peak value $E_1+E_2$ being substantially identical to the charges developed on the energy-storage elements C' and C'' of the first and second rectifying units, respectively.

Condenser C', C'', and C''' are connected in series relation, and the polarity of the charges developed thereon is such that the output of condenser C''' taken with respect to ground through the isolation resistor $R_2$ is substantially the sum of the charges developed on the individual condensers.

It will be obvious that any number of rectifier units may be connected in cascade in the manner disclosed by the present invention. For example, if more than three such units are connected together, then the elements $V_3$, $C'''$ and $L_4C_4$ may comprise the final stage, the additional units being inserted prior to this final stage as indicated in the drawing by the broken lines. In such an event, the output of the condenser $C'''$ taken with respect to ground may be represented by the formula $$(E_1+E_2)nk$$

where $E_1+E_2$=the charge developed on each energy-storage condenser of the network;
$n$=the number of rectifier units employed;
$k$=the correcting factor (if attenuation is of importance. Normally $k$ is very nearly unity).

The parallel inductance - capacitance circuits $L_2C_2$ and $L_4C_4$ are designed to be maintained at the free resonance frequency of the transformer T and its associated system. If the Q of these LC circuits is high, they may act, in effect, as energy-storage reservoirs to provide repeated cyclic charging of the condensers $C''$ and $C'''$. This results in a considerable improvement in the overall efficiency of the rectifier system, and some increase in the stability of the output voltage.

Another factor in improving the efficiency as well as the D.-C. regulation of the rectifier system resides in the use of the parallel resonant circuits $L_2C_2$ and $L_4C_4$ in the D.-C. path rather than resistor elements. This substantially eliminates the voltage drop and D.-C. ohmic power loss caused by such resistor elements.

Still another advantage resulting from the employment of the parallel inductance-capacitance circuits $L_2C_2$ and $L_4C_4$ is that the several lumped and distributed capacitances of the rectifier system are split up to act, in effect, as portions of a band-pass filter network. Accordingly, these lumped and distributed capacitances are not added as a summation of capacitances across the windings of the transformer T. Hence, the $$\sqrt{\frac{L}{C}}$$

ratio of the transformer system, and thus the impedance Z, is increased to bring about a decrease in the proportion of each deflection cycle required for the snapback, or retrace, of the cathode ray scanning beam due to increasing the possible value of the resonant frequency, $$f=\frac{1}{2\pi\sqrt{LC}}$$

As an alternative to the above, the impedance of the system may be substantially increased as the value of L is increased. This expedient need not change the percentage of the deflection cycle allotted for retrace of the cathode ray beam if the resonant frequency ($f$) is maintained constant by holding the product LC constant, but the higher value of transformer winding inductance L does allow a higher voltage to be developed across the transformer winding, thereby raising the value of the charge $E_1+E_2$ appearing on each of the energy-storage condensers $C'$, $C''$ and $C'''$. Obviously, various combinations of these two conditions may be made in any desired proportions.

Although the invention has been described in connection with input pulses derived from the windings of the output, or coupling, transformer in a television line-scanning circuit, it will be understood that the disclosed rectifier is adapted to utilize an input derived from a so-called radio-frequency driver system. In such an event, the various LC circuits of the rectifier network are designed to be resonant at the RF input frequency.

Having thus described my invention, I claim:

1. In a system for obtaining a substantially smooth D.-C. output voltage from an input comprising a series of substantially unidirectional voltage pulses: the combination of a first rectifying unit comprising a unilateral conducting device and an energy-storage element connected in series relation across said unidirectional pulse input; a second rectifying unit comprising a further unilateral conducting device, a further energy-storage element connected in series relation with said further unilateral conducting device, and a parallel inductance-capacitance circuit designed to be resonant at a multiple of the frequency of the said input pulses, said parallel inductance-capacitance circuit being connected in shunt with the series combination of said further unilateral conducting device and said further energy-storage element; and means for coupling together said first and second rectifying units so that the respective energy-storage elements of the units are in series relation.

2. A system in accordance with claim 1, in which said means for coupling together said first and second rectifying units includes a series resonant circuit, the frequency of resonance of which is a multiple of the frequency of the said input pulses, said parallel inductance-capacitance circuit together with said series resonant circuit constituting a band-pass filter network which acts in effect to isolate the shunt capacitances of the said first and second rectifying units.

3. In a voltage step-up system: the combination of a plurality of rectifying units, each of said units comprising a rectifier, a condenser in series with said rectifier, and, with the exception of the first of said units, a parallel inductance-capacitance combination shunting said rectifier and condenser; and means for connecting the parallel inductance-capacitance combination of each of said units except the first in shunt with the rectifier of the preceding unit so that the respective condensers of the units are in series relation.

4. A system in accordance with claim 3, in which said connecting means includes a series inductance-capacitance combination connected between each two adjacent rectifying units.

5. In a system for obtaining a substantially smooth D.-C. output voltage from an input consisting of a series of substantially unidirectional voltage pulses, the combination of a plurality of rectifying units connected in cascade, the first of said units comprising a rectifier and a condenser connected in series across said input, each of the remainder of said units comprising an additional rectifier, an additional condenser in series with said additional rectifier, and an energy-storage circuit in parallel with the series combination of said additional rectifier and said additional condenser, said energy-storage circuit being resonant at the frequency of the said input pulses to provide repeated cyclic charging during operation of the system of the condenser included in its respective rectifying unit.

6. A system in accordance with claim 5, further including means for connecting together the condensers of each of the said rectifying units in series so as to provide an output voltage for the system which is substantially the sum of the charges developed on the condensers of each of the units.

7. In a system for obtaining a substantially smooth D.-C. output voltage from a cyclically varying voltage input, the amplitude of said output voltage being approximately twice the peak value of the said input voltage, comprising a first rectifier and a first condenser connected in series across the input terminals of said system, a parallel inductance-capacitance circuit in shunt with said first rectifier, the resonant frequency of said inductance-capacitance circuit being a multiple of the recurrence frequency of the said cyclically varying input voltage, a second rectifier and a second condenser connected in series across said parallel inductance - capacitance circuit, and means for coupling together said first and second condensers in series relation.

ALBERT WILEY FRIEND.

No references cited.